W. H. Abel.
Knitting Straight.

Nº 83,584. Patented Nov. 3, 1868.

Sheet 2.- 7 Sheets.

Fig. 2.

Witnesses.
John E Crane
J. B. Samuels

Inventor.
Wm. H. Abel.

W. H. Abel.
Knitting Straight.

N°. 83,584.

Sheet 3.- 7 Sheets.

Patented Nov. 3, 1868.

Witnesses.
John E Brown
J. B. Samuels

Inventor.
Wm. H. Abel

W. H. Abel.
Knitting Straight.

N° 83,584.

Patented Nov. 3, 1868.

Witnesses.
John E. Crane
J. B. Samuels

Inventor.
Wm. H. Abel

W. H. Abel.
Knitting Straight.

Nº 83,584.

Patented Nov. 3, 1868.

Witnesses.
John E. Crane
J. B. Samuels

Inventor.
Wm. H. Abel

W. H. Abel.
Knitting Straight.

N° 83,584.  Patented Nov. 3, 1868.

UNITED STATES PATENT OFFICE.

WILLIAM H. ABEL, OF GREENVILLE, RHODE ISLAND.

IMPROVEMENT IN KNITTING-MACHINES.

Specification forming part of Letters Patent No. 83,584, dated November 3, 1868; antedated October 22, 1868.

*To all whom it may concern:*

Be it known that I, WILLIAM H. ABEL, of Greenville, in the county of Providence and State of Rhode Island, have invented certain new and useful Improvements in Knitting-Machines, of which the following is a full, clear, and exact description, reference being had to the accompanying drawings, making part of this specification, in which—

Fig. 3, Sheet 3, is a plan or top view after the upper portions, 37, have been removed. Figs. 9 and 10 on Sheet 3 are side views of the jacks used in this machine. Fig. 11 is an edge view, and Fig. 12 a transverse section, of said jack. Fig. 13 is a side, and Fig. 14 an edge, view of the cam used for depressing the jacks.

In this invention and improvement in knitting-machines, the ends A are secured to a bed-plate, B, which holds them in a vertical position. Between the ends A, and near the rear top corners, a cam-shaft, C, is arranged in suitable bearings; and near the front side of the machine, below the middle, there are three rocking shafts, D E F, hung on centers *a*, which screw through the ends B of the machine and enter the ends of the rocking shafts. Each of these centers has a check-nut, *b*, to prevent their turning in either direction when set and adjusted.

The upper rocking shaft, D, has two arms, G, extending upward to near the top of the machine, where the top ends of said arms connect with ears *d*, fastened to the back side of the lower jaw, *g*, of the needle-clamp, the upper jaw, *f*, of which has a rib, 1, projecting downward from its back edge, resting in a groove in the upper side of the lower jaw.

The back sides of the two jaws are held in contact by plates *h*, having a projection, *i*, extending forward over the top jaw. Said plates are fastened to the back side of the lower jaws by screws. The back ends of the needles are bent downward and inserted in holes made in the lower jaw, *g*. The horizontal portion or shank of each needle rests in a transverse groove in the lip 2 of the lower jaw.

The lip 3 of the upper jaw, *f*, is brought down upon the needles by a screw, *k*, passing through one jaw and screwed into the other. A suitable spring, arranged between the two jaws, throws them apart when the screw *k* is loosened, thereby providing for the removal of broken needles and replacing of perfect ones.

Projecting from the back side of the shaft D is a lever, H, the end of which is oval in form, but the sides are flat, and a vertical slot, 4, is made through this oval end. Through this slot a stud, 5, is arranged, which may be moved up or down in the slot when a greater or less motion of the lever H is required. A bowl or roller, I, rotates on the stud 5. The lever H is depressed by means of a cam, J, secured to the cam-shaft C, that strikes the bowl, and it is elevated by a curved spring, K, the lower end of which is fastened to the top of a hub, L, rising from the center of the bed-plate B.

Figures 7, 19, 20, 21, 22:
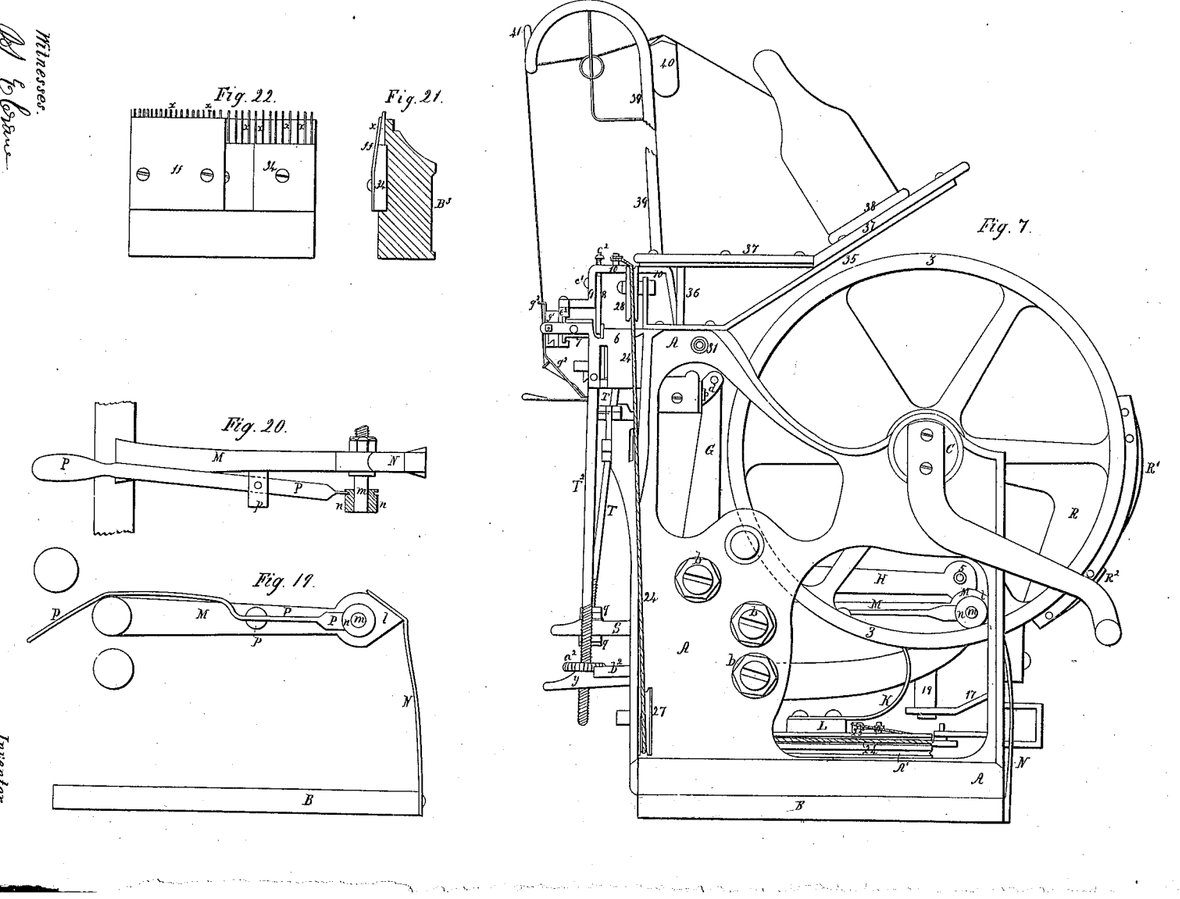
Fig. 7, Sheet 7, is a right-hand end view.
Fig. 19 on Sheet 7 is a side view of a lever, M, shown in Figs. 3 and 7, with the shipping-handle P employed for disengaging the bowl or roller from the working parts of the cam R and the spring N, which depresses the end of the arm after the cam has passed the bowl.
Fig. 20 is a top view of the said lever, shipping-handle, bowl, and spring.
Fig. 21 is a transverse section of the drawing-over bar, with the lead and sinkers on the face of it, and a plate, *f f*, shown in red lines.
Fig. 22 is a front view of a portion of said bar after a part of the plate *f f* has been removed, showing one lead of sinkers, 34, and part of another.

A little below and back of the rocking shaft D is the rocking shaft E, which has a lever, M. (Shown in Figs. 19 and 20 on Sheet 7.)

This lever extends back a little farther than the lever H, and has an angular pointed end, l. A spring, N, fastened to the bed-plate B, has its top end bent to fit the angular end of the lever M, to bear and hold said lever down.

Projecting from one side of the lever M, and secured thereto near its end, is a stud, m, on which is arranged a rotary and sliding bowl or roller, n. This roller is moved along on the stud m by a shipping-handle, P, pivoted to a stud, p, projecting from the side of the lever.

A cam, R, on the cam-shaft C acts upon the roller n and the lever M at each revolution of said cam-shaft; but when a looped welt is being formed on this machine the roller n is moved away from the path of the cam R, which, in the ordinary course of knitting, acts upon the presser-bar U through the medium of the arms S and rods T, the top ends of said rods being connected with the presser-bar near its ends, and the lower portion of said rods pass through the arms S, and are adjustable vertically by nuts q, screwed onto said rods above and below the arms S.

Below the rocking shaft E is the rocking shaft F, which has a curved lever, v, extending back to near the end of the lever H. This lever is acted upon by the cam W at each revolution of the cam-shaft C; and, through the medium of the arms Y, projecting forward from the shaft F, and the rods $T^2$, connected with the ends of the lifting-bar e, the jacks c are raised at proper intervals.

The lower portions of the rods $T^2$ pass through the arms Y, and a nut, $a^2$, screwed onto each of these rods above the arms, renders the arms and rods adjustable to raise the bar e and jacks c to the desired height.

A spring, $b^2$, secured to the side of each of the arms Y, and engaging with the notched edges of the nuts $a^2$, prevents said nuts (when set or adjusted) from turning.

To the front side of the machine, and at the upper end, a spring-bar, 6, is secured, and directly forward of this spring-bar is a slide-bar, 7. These two bars are connected at their ends; but there is an open space along between the two ends.

Figure 4:
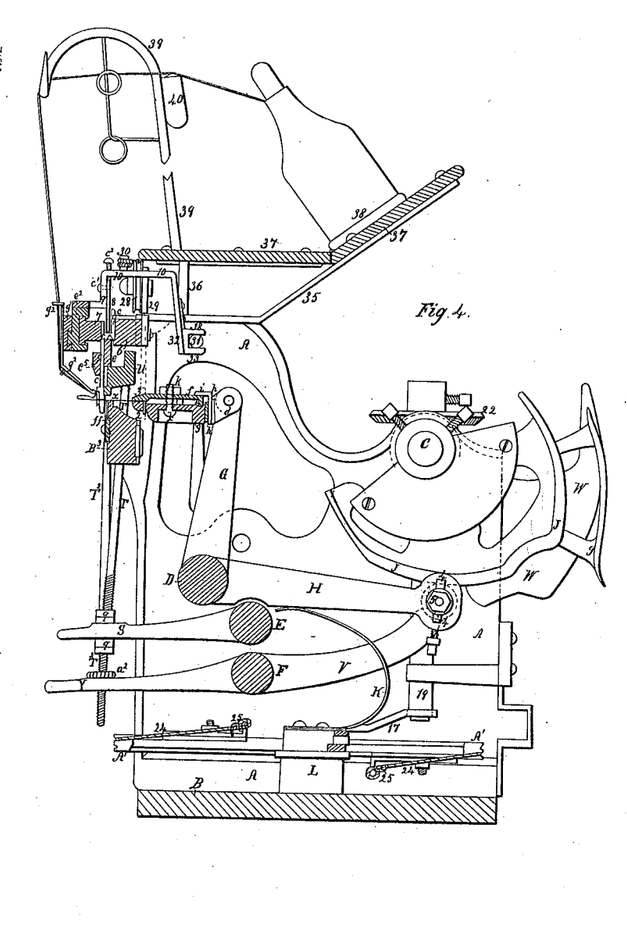
Fig. 4, Sheet 4, is a transverse section on the line Y Z of Fig. 2, but with the friction-slide and thread-carrier near the center of the machine, to bring the lines Y Z together.

Vertical grooves are formed in the forward side of the spring-bar, and corresponding grooves in the back side of the slide-bar. These grooves are opposite to each other in the two bars, and are for the reception of the vertical-sliding jacks c, which are moved upward by the lifting-bar e and depressed by the cam 8, secured to the inner side of the front portion, 9, of the top bracket. This cam 8 is adjustable vertically by screws $c^1$, passing through the front portion, 9, and by screws $c^2$, passing through the top 10 of the bracket. The former screws enter the side of the cam, and the latter press on the top end of it, so that when the lower end, 12, of the cam (shown in Fig. 13 and Sheet 3) is worn off, the screws $c^2$ are screwed in, and the cam forced down a little to insure its proper action on the jacks as it moves along over and in contact with the top shoulders of said jacks, all as clearly shown in Figs. 4, 9, and 10.

A slide-box, $e^2$, (shown in Figs. 1, 2, 4, 6, 7, and 8,) slides longitudinally on the slide-bar 7, and the top bracket is secured to the upper edge of the slide-box.

A friction-slide, $g^1$, having a thread-guide, $g^2$, fastened to its front side, is arranged to slide longitudinally on the face of the slide-box.

It will be observed that the slide-box has more motion longitudinally than the friction-slide and thread-guide, and to bring the latter into the right position to deliver thread to the needles in proper time the longitudinal motion of the friction-slide and thread-guide must cease before the same motion of the slide-box ceases.

To arrest the motion of the friction-slide and thread-guide, I employ an adjustable stop, $d^2$, at each end of the slide-bar, so that when the friction-slide and thread-guide have moved a sufficient distance in either direction the end of said friction-slide comes in contact with one of the adjustable stops, which stops the friction-slide and thread-guide in the right place.

Figures 5, 16, 17, 18:
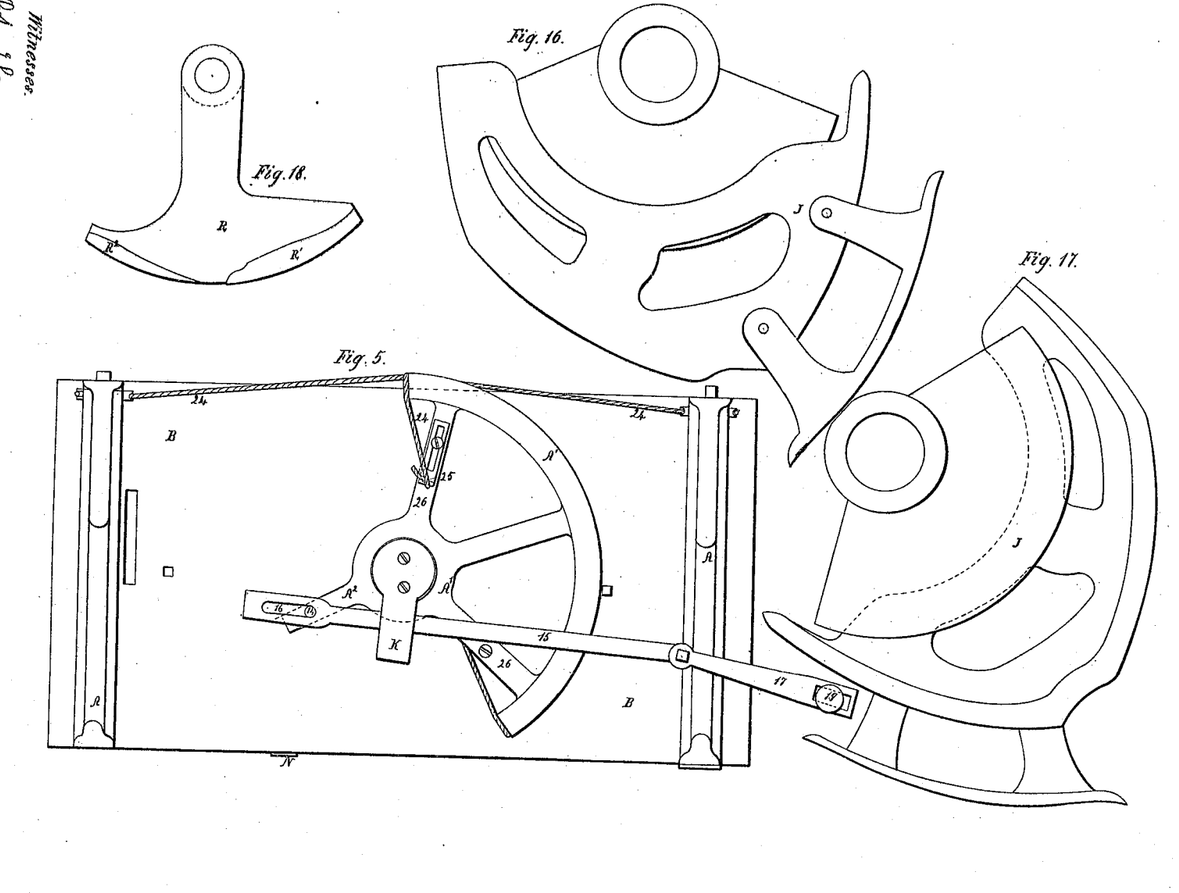
Fig. 5, Sheet 5, is a horizontal plane section on the line A B of Fig. 2.
Figs. 16 and 17, on Sheet 5, represent the two sides of a full-size detached cam, J, shown in Figs. 1, 2, 3, 4, and 6.
Fig. 18 shows the working side of a half-size detached cam, R, shown in Figs. 1, 2, 3, 6, and 7.

On the hub L, which rises from the center of the bed-plate B, I arrange a concentric segment of a wheel or pulley, $A^1$. (Shown in Figs. 1, 2, 3, 4, 6, and 7, and more clearly shown in Fig. 5.) This segment has an arm, $A^2$, projecting from one side of the hub thereof, and a stud, 14, is secured to said arm near its end.

A connecting-rod, 15, having an elongated slot, 16, in one end, to receive the stud 14, connects with a crank-arm, 17, on the lower end of a vertical shaft, 19, supported in bearings 20 and 21, projecting outward from the left-hand end of the frame, near the rear side.

A bevel-gear, 22, on the top of the shaft 19 gears into a smaller bevel-gear, 23, on the end of the cam-shaft C.

The vertical shaft, crank, connecting-rod, and segment receive their motion from the cam-shaft through the bevel-gears. The outer edge of the segment-rim is grooved to receive two cords, 24. One end of each cord is fastened to an adjustable slide-piece, 25, on each of the arms 26. Each cord passes around opposite ends of the segment and the rim in the grooves and under pulleys 27 in the ends A of the frame near the bottom; thence upward outside of said ends, and over pulleys 28, arranged on ears 29 above the spring-bar 6; thence inward to the upper side of the top bracket, where the ends are fastened to a pin, 30, secured to the top of said bracket for that purpose.

Between the ends A of the frame, and near the top front portions, a rod, 31, is arranged, and on the rear side, 32, of the top bracket is a plate having two projections, 33, extending back above and below the rod 31, to steady the top bracket when moved with the slide-box from end to end of the machine.

A little below the spring-bar 6 is the drawing-over bar B³, fastened to the front of the ends A. This latter bar is provided with leads 34 of sinkers X along on the front side, where the needles are run out over the top edge of said bar between the sinkers X.

On the face or front of the leads and sinkers I secure a plate, $ff$. (Shown in Figs. 1, 21, and 22.) The top edge of this plate should be as high as the top edge of the bar B³, so that the needles will rest on the top edges of both bar and plate, and the top ends of the sinkers serve as lateral guides for the needles. These sinkers are cast in short sections of leads, about one inch from side to side, and if one of the sinkers gets broken the short section of lead can be easily removed and replaced by a perfect one, whereas in the use of the ordinary knocking-over bar or drawing-over bar, which has the top edge notched, or notches formed by inserting steel plates in the front side and above the edge of the bar, as in the machine patented by Paget in England, if one of the steel plates is broken or the side of a notch destroyed the whole bar has to be removed, the machine stopped for a considerable time, and much trouble and inconvenience submitted to simply to replace a sinker or repair a notch.

Between the spring-bar 6 and the slide-bar 7, and in the vertical grooves made in said bars, I employ a series of vertical sliding jacks, $c$, which have a looping-sinker, $c^6$, and dividing-sinkers $c^7$, either formed in one with or permanently secured to the lower ends of said jacks, as clearly shown in Figs. 9, 10, 11, and 12; and when these combined jacks and sinkers are depressed by the cam 8, secured to the inner side of the portion 9 of the top bracket, each of the sinkers passes downward between two needles, the sinkers $c^6$ draw a loop for every other needle, and downward across the stems of all the needles, which are then drawn back, bringing said loops under the beards of all the needles, and to the heads or extreme ends thereof, said loops being divided by the sinkers $c^7$ or dividing-sinkers, thus forming a loop for every needle. The combination-jacks $c$ and sinkers are then raised by the lifting-bar $e$, leaving these loops clear and connected with the web. Each course of loops is formed in the same manner as the process of knitting is continued on the machine.

Figure 1:
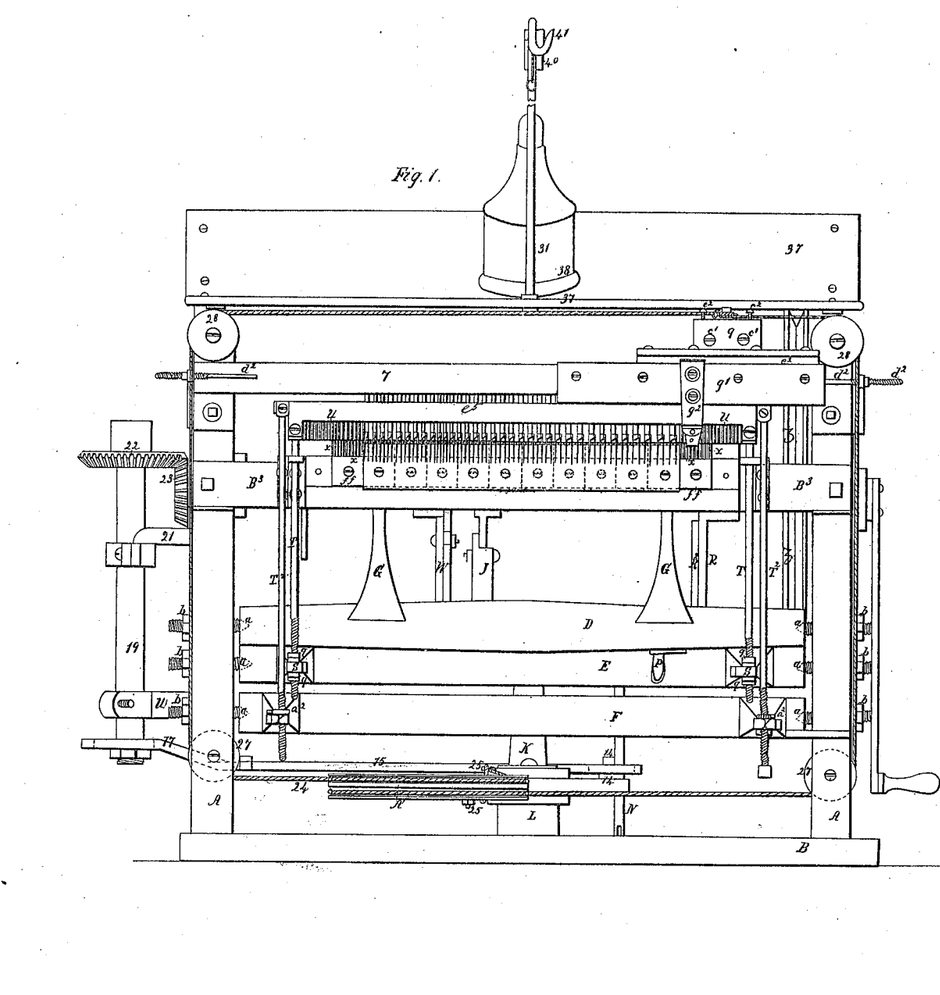
Figure 1, Sheet 1, represents a front, and Fig. 2, Sheet 2, a rear side, elevation.
Figure 2:
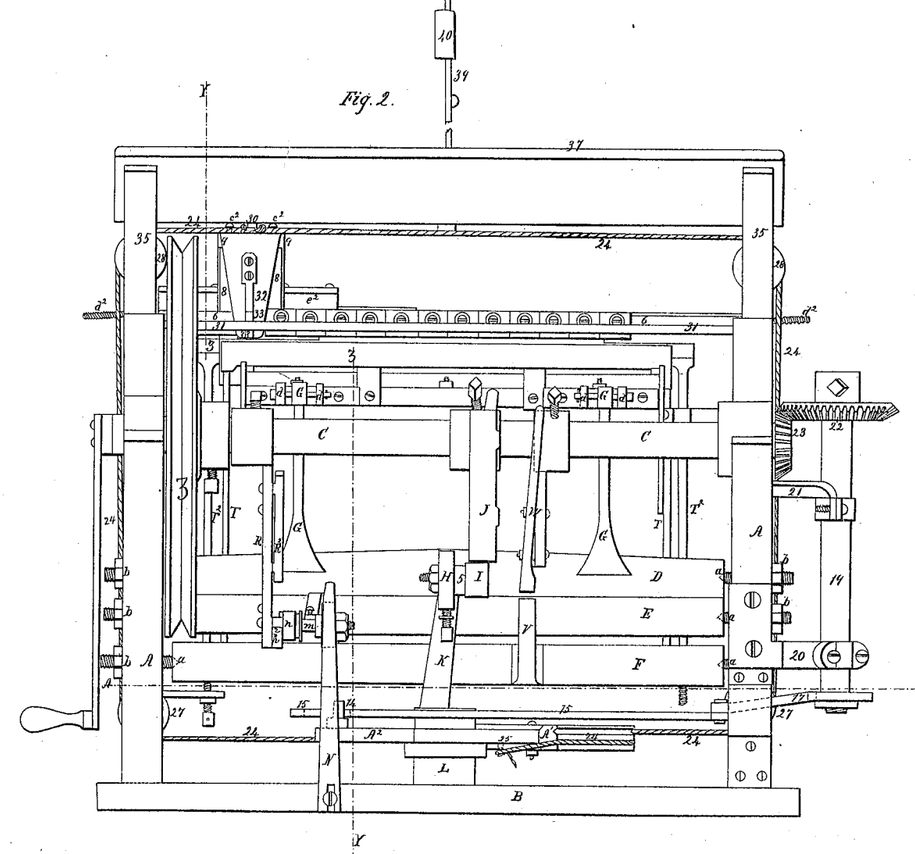

When the jacks are raised by the lifting-bar $e$, shoulders $e^4$ on the front edges of the jacks come against the lower edge of a gage-bar, $e^5$, which brings all the jacks in a straight line, and in the right position for depression and looping. This gage-bar is connected at its ends to the front side of the presser-bar, as shown in Fig. 1.

It will be readily seen that, by making the sinkers $c^6$ and $c^7$ short and combining them with each side of the jack, there are many advantages gained, which are as follows: First, very thin sinkers may be used, and finer and closer fabric produced; second, the operating-cam which depresses the jacks does not come in contact with the sinkers to break or injure them; third, the jacks and sinkers, being combined, are all operated together and by one simple cam, 8; fourth, the jacks, being thick and rigid or stiff, are not liable to get bent or crippled when acted upon by the depressing-cam; fifth, only a slight pressure is required, and on the side of each jack, to hold them in position to be operated or depressed by the cam 8, or for any other purpose.

The slight pressure on the sides of the jacks to hold them up is obtained by small friction-springs $g^6$. (Shown in Fig. 3 on Sheet 3.) On the top of the spring-bar 6 these springs are held in leads $g^7$, cast in short sections, and fastened to the back side of the spring-bar.

I have said that I use a plate, $ff$, on the front of the drawing-over bar, and that the needles rest or bear on the top edge of said bar and plate. By the use of this plate the strain or tension on the thread is greatly diminished, as the last loops formed at the top of the web are drawn over the smooth, straight edge of the plate when the needles are drawn back, instead of between the sinkers, where said loops are liable to be nipped or broken, making a hole in the web or a tuck-stitch. This plate insures perfect and sound knitting.

On the top of the machine, above the frame, and supported by suitable brackets 35 and by vertical rods 36, is a top cover and creel-board, 37, to support the thread-spool 38, leading bracket 39 to the back, and near the top of which is an oil-cup, 40. This oil-cup has a wick, or piece of sponge or cloth, or other suitable substance, placed within it, and drawn over a bar at its top, to draw up oil by capillary attraction, and oil the thread as it is led from the spool 38 over said oiler and the leading-hook 41 to the thread-guide.

Power is applied to this machine by a belt or band running from a suitable rotating driving-pulley onto the pulley 3 on the cam-shaft C, causing the cam-shaft to rotate and bring the cams J, R, and W into contact with the bevels beneath them, in regular order, and through the bevel-gears, one on the end of cam-shaft and the other on the top end of the vertical shaft 19. Said shaft is rotated, and, by means of the crank-arm 17 and connecting-rod 15, connected with the stud 14 and arm A² of the segment-wheel. Said segment is oscillated or swung each way, and, by means of the cords 24, fastened to the said segment, and running around pulleys 27 and 28, and fastened to the pin 30 at the upper side of the top bracket.

Longitudinal reciprocating motion is given to the slide-box, friction-slide, and feed-guide, which slide carries the cam 8 along over and in contact with the top shoulders of the combined jacks, forcing said combination-jacks downward to form loops by means of the looping-sinkers $c^6$, as hereinbefore stated. As soon as these loops are formed the needles are drawn backward by the vertical arm G, extending upward from the shaft D, and connected at their top ends with the back side of the needle-clamp, said arm G and shaft D receiving a rocking motion by the rotating cam J, which acts upon the bowl I, secured to the end of the lever H, projecting from the rear side of the rocking shaft D.

When the needles have been drawn so far back as to bring the points of the needle-beards directly under the lower edge of the presser-bar U, there is a slight downward motion of said presser-bar, to depress the beards of the needles and allow the top loops on the webbing to slide over the needle-beards and forward to the heads of the needles where the newly-formed loops have been divided and formed, as before described. This downward motion of the presser-bar is produced by the portion $R^2$ of the cam R acting on the lever M, extending back from the rocking shaft E. (Said portion $R^2$ of cam R shown in Fig. 18.) As soon as these loops reach the heads of the needles, as above stated, the combined jacks and sinkers are raised in a body by the lifting-bar $e$, through the agency of the rods $T^2$ and arms Y, the lever $v$, and cam W. The backward motion of the needles is continued, and the old loops are drawn over the newly-formed loops by the top edge of the plate $f\,f$. The combined jacks are then brought downward in a body to a position for looping by the lower edge of the gage-bar $e^5$, connected with the front side of the presser-bar U, and by rods T, connected with the bar U, and arms S, projecting forward from the rocking shaft E, being operated by the cam R or the portion $R^1$ of said cam. (Shown in Fig. 18, Sheet 5.) The needles are then partially returned forward by the curved spring K, and fully returned to the position for receiving the loops by cam J acting on the lever H, or the bowl at the end thereof, thus bringing the needles and combined jacks and sinkers into the position first named.

Each operation of the machine and course knit is performed in the same manner.

In forming a looped welt on this machine, the same process of looping is performed, except that the beards of the needles are not depressed, but the old or already-formed loops pass under the needle-beards to the heads of the needles. This operation is effected by moving the roller $n$ on the stud $m$ by the shipping-handle P, to throw the roller $n$ out of the path of the cam R or the operating portions $R^1$ $R^2$ of said cam.

With the old and the newly-formed loops at the heads of the needles, as above stated, the the bar of hooks (shown in Figs. 6 and 8) is taken in the hand of the operator, and the hooks on said bar pushed upward from beneath the needles, and between them and the points of the hooks above the needles. Said bar of hooks is then drawn forward and downward, the hooks having caught the loops at the heads of the needles, drawing said loops downward to the length required, being less than one-fourth of an inch.

The roller $n$ on the stud $m$, projecting from the side of the lever M, is thrown into contact with the cam R by the shipper P, and the knitting resumed.

Figure 6:
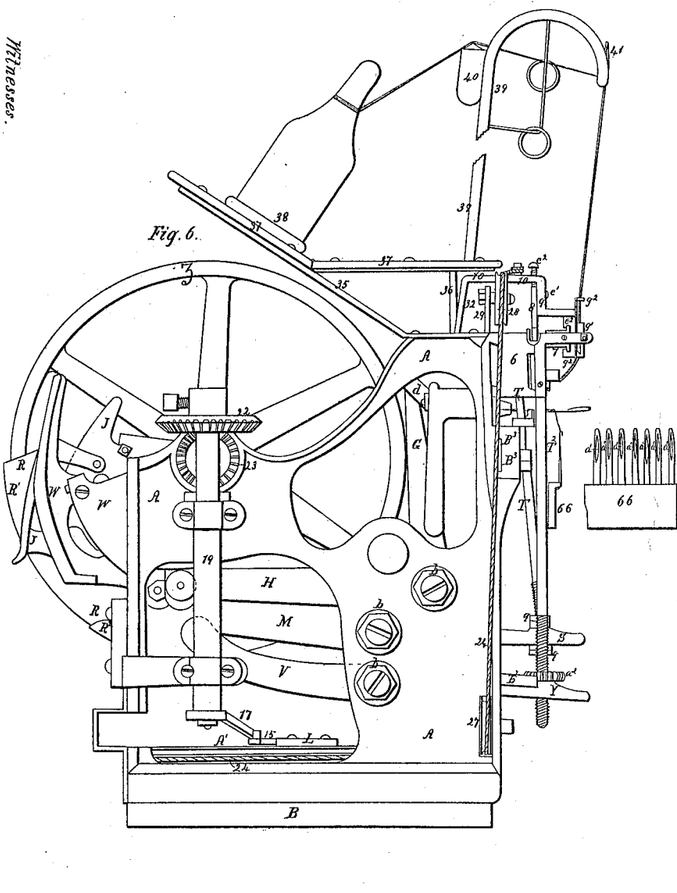
Fig. 6, Sheet 6, is a left-hand end view.
Figures 8, 9, 10, 11, 12, 13:
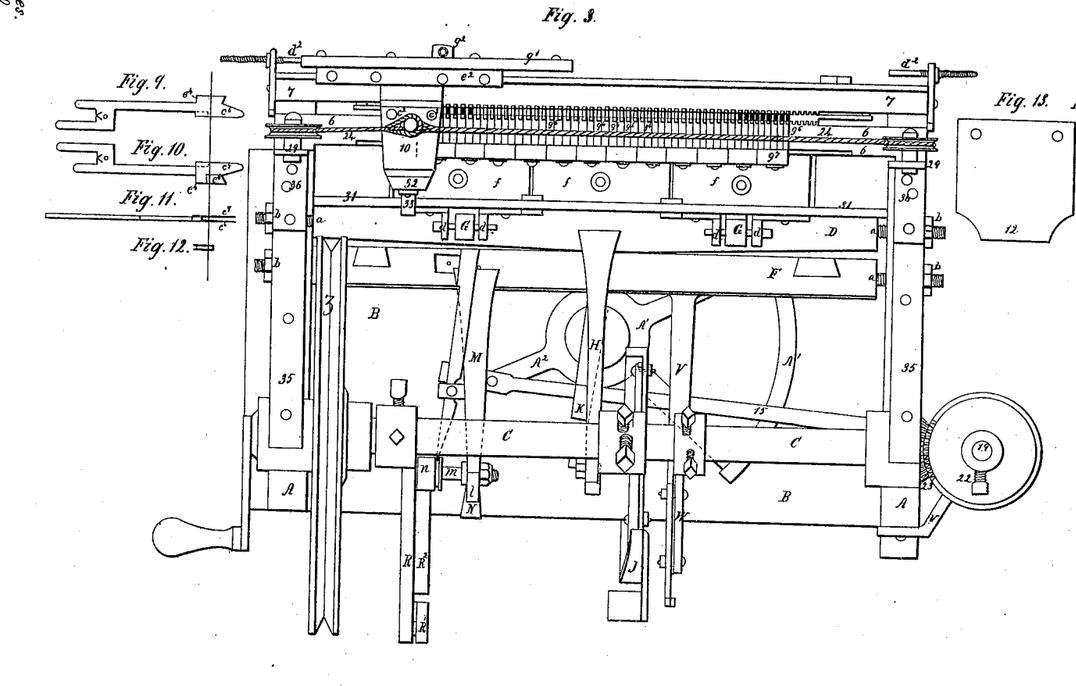
Figure 8:
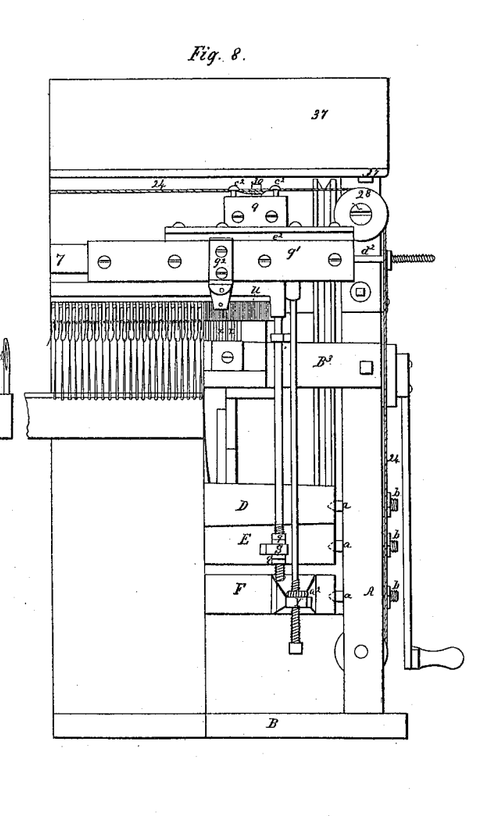
Fig. 8, Sheet 6, represents a portion of the front side of my machine, with a side view of a bar of hooks used for looping welts, with loops in red lines, depending from the needles and caught by the hooks. An end view of said bar of hooks is shown in Fig. 6, and a back side view of a section of said hooks 66 shown between 6 and 8.
Figure 14:
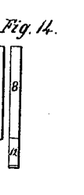
Figure 15:
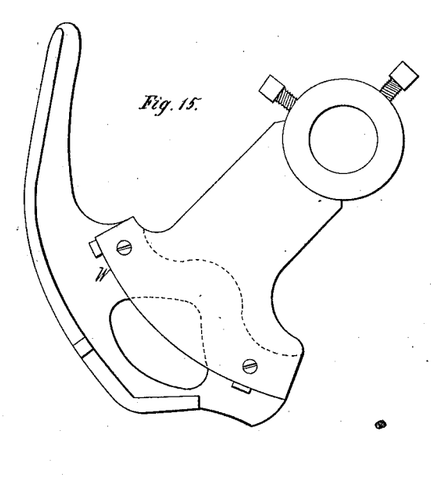
Fig. 15 on Sheet 4 is a side view of a full-sized detached cam, W, shown in Figs. 1, 2, 3, 4, and 6.

After a sufficient length of fabric has been knit to form a looped welt of the desired dimensions, the bar of hooks, which still hangs to the web, is lifted. The loops held and retained by the points or hooks are slid down on the stems of said hooks. The grooves $o^1$ at the back sides of the hooks shown at 66, between Figs. 6 and 8, are placed upon the ends of every other needle, and the loops slid off from the stems of the hooks onto the needles, the hooks withdrawn from the loops by turning the bar of hooks, or the bar thereof, upward, releasing or unhooking the hooks from the loops, and leaving said loops on the needles, and the process of knitting is then continued.

By reason of the great simplicity of construction and operation of this machine, it may be operated with great rapidity, and as many as sixty courses per minute may be knit, and of fine, close, selvage goods, whereas, by any of the other straight knitters, in my opinion, not more than thirty courses can be knit, and that coarser and inferior in quality.

Having fully described my invention and its operation, what I claim as new, and desire to secure by Letters Patent, is—

1. The sinkers $c^6$ and $c^7$, constructed as described, combined with the jacks $c$, and operating in combination with the needles, in the manner and for the purpose set forth.

2. In combination with the jacks $c$, which have sinkers $c^6$ and $c^7$, constructed, combined, and operating as set forth, the springs $g^6$, arranged to operate as and for the purpose specified.

3. The plate $f\,f$, applied to the face of the knocking-over bar, in the manner and for the purpose substantially as specified.

4. The combination of the vertical shaft 19, operating as set forth, the crank-arm 17, connecting-rod 15, the segment with its arm $A^2$, cords 24, pulleys 27 and 28, and the top bracket, the whole arranged to operate substantially in the manner and for the purpose specified.

5. The combination of the friction-slide and slide-box with the parts last above claimed, as and for the purpose set forth.

6. The lever M, for operating the presser-bar, when provided with a pin or stud, $m$, and a rotary sliding roller, $n$, and with a shipping device, substantially as and for the purpose specified.

7. The combination of all the operative parts herein described, arranged to operate substantially in the manner and for the purpose set forth.

WM. H. ABEL.

Witnesses:
 ROBERT H. BROWN,
 WILLIAM T. START.